T. C. PHILLIPS.
AUTOTRUCK.
APPLICATION FILED FEB. 23, 1912.
1,118,578. Patented Nov. 24, 1914.
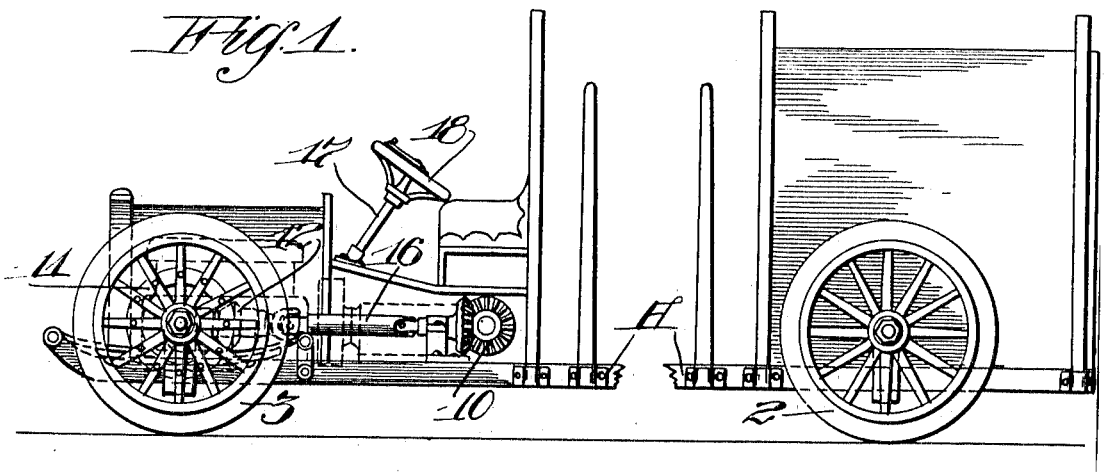
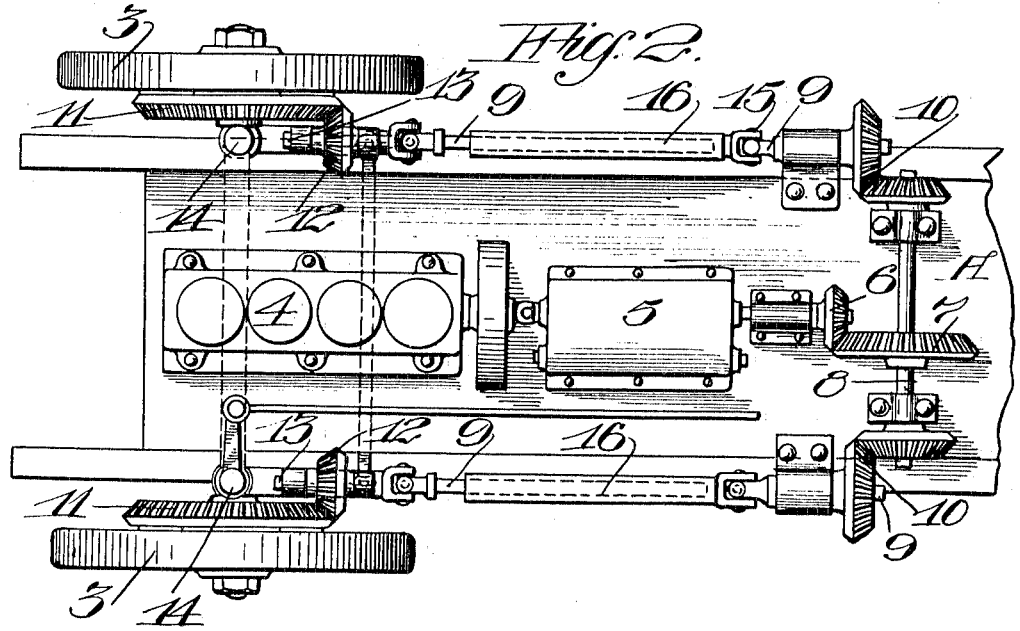
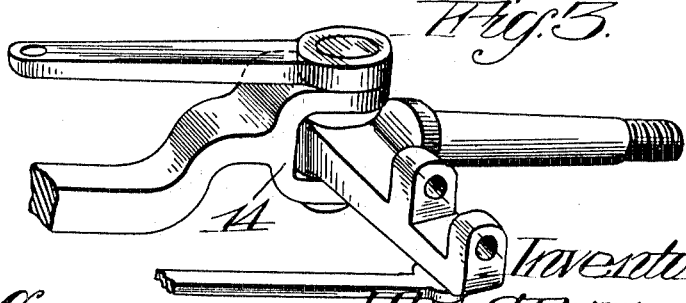
Witnesses
Thos Castberg
R. A. Berry
Inventor
Tony C. Phillips
by G. H. Strong

UNITED STATES PATENT OFFICE.

TONY C. PHILLIPS, OF SAN FRANCISCO, CALIFORNIA.

AUTOTRUCK.

1,118,578.  Specification of Letters Patent. Patented Nov. 24, 1914.

Application filed February 23, 1912. Serial No. 679,255.

*To all whom it may concern:*

Be it known that I, TONY C. PHILLIPS, a citizen of the United States, residing in the city and county of San Francisco and State of California, have invented new and useful Improvements in Autotrucks, of which the following is a specification.

My invention relates to improvements in vehicles and especially in that class of vehicles having low hung bodies and known as "trucks" for the transportation of goods which are most conveniently moved upon such bodies.

It consists in the combination with such a truck body of an internal combustion engine mounted at the extreme front of the body, and means whereby the power of said engine may be transmitted to the forward wheels without interfering with the necessary turning of the wheels for steering purposes; the apparatus so constructed leaving the entire rear portion of the body free for the reception of the load.

The invention consists of the parts and the construction and combination of parts as hereinafter more fully described and claimed, having reference to the accompanying drawings, in which—

Figure 1 is a side elevation of my truck. Fig. 2 is a plan view showing the relative connection of the engine and the transmission shafts and gear. Fig. 3 is a perspective view of the steering knuckle and gear bracket.

A is the body of a vehicle known as a "truck", having the rear wheels 2 and the front wheels 3; the truck body being, as is usual in such cases, carried beneath the line of the wheel axles either upon the usual crank axle or may be supported upon springs if preferred.

Upon the front end of the platform A is located the engine 4, which may be of any suitable construction. I have here illustrated a four-cylinder engine, a transmission gear case 5 and a shaft extending therethrough which carries a beveled pinion 6 which engages with a gear 7 upon a jack-shaft 8 properly journaled across the vehicle. Upon each side substantially parallel shafts 9 extend toward the front and power is transmitted to them from the shaft 8 by a bevel-gear, as at 10.

The front wheels 3 of the vehicle have annular gears 11 carried concentric with their axes and these may be engaged by pinions 12 upon shafts 13 which are substantially extensions of the shafts 9.

In order to accommodate these connections to the varying positions of the wheels 3, which are turnable about the steering knuckles 14, I have shown the universal joint 15 having an extending sleeve 16. This sleeve is substantially polygonal and the extension of the shaft 9 enters this polygonal sleeve and, by reason of the shape, power is transmitted from the shaft through the universal joint 15 and thence to the shaft 13, the pinions 12 and the gears 11 upon the wheels.

17 is a steering post of the apparatus operated by a wheel 18 and having the usual or suitable connections with the steering knuckles, such connections being not here shown.

It will be seen that by this construction the wheels may be turned to any desired degree for the purpose of steering, and the telescopic shafts and universal joints act together so that a very considerable change of angle may take place without interfering with the steering and the driving of the wheels. The engine and the jack-shaft 8 may thus remain substantially in fixed relation with each other and not be deranged by the steering of the wheels.

It will thus be seen that the whole motor force of the car is located at the extreme front thereof and the whole rear platform is open for the transportation of goods without in any way interfering with the motor.

Having thus described my invention, what I claim and desire to secure by Letters Patent is—

In an auto truck, a body having axles fixed rigidly at right angles thereto, steering knuckles and wheel spindles pivoted to the outer ends of the front axle, arms extending rearwardly at right angles from the wheel spindle pivots, and carrying boxes with short shafts journaled in the boxes, pinions on said shafts, gears on the wheels meshing with said pinions, short shafts journaled parallel with the truck sides rearwardly of the front wheels, a transverse shaft, beveled gears to transmit motion to said short shafts, telescopic shafts extending between said short shafts and the shafts carried by the steering knuckles, and universal joint connections at the ends of the telescopic shaft members.

In testimony whereof I have hereunto set my hand in the presence of two subscribing witnesses.

TONY C. PHILLIPS.

Witnesses:
G. H. STRONG,
CHARLES EDELMAN.